United States Patent [19]

Horsley

[11] Patent Number: 5,426,723
[45] Date of Patent: Jun. 20, 1995

[54] SYSTEM AND METHOD FOR SCALING GRAPHIC IMAGES

[75] Inventor: Eric R. Horsley, Seattle, Wash.

[73] Assignee: SpaceLabs Medical, Inc., Redmond, Wash.

[21] Appl. No.: 848,683

[22] Filed: Mar. 9, 1992

[51] Int. Cl.⁶ .............................................. G06F 15/62
[52] U.S. Cl. .................................... 395/128; 395/133; 395/139; 395/162
[58] Field of Search ................................ 395/123–129, 395/133, 139, 162, 164; 358/140

[56] References Cited

U.S. PATENT DOCUMENTS

| | | | |
|---|---|---|---|
| 4,484,347 | 11/1984 | Kashioka | 382/47 |
| 5,065,346 | 11/1991 | Kawai et al. | 395/128 |
| 5,150,461 | 9/1992 | Reynolds | 395/164 |
| 5,229,853 | 7/1993 | Myers | 358/140 |
| 5,269,021 | 12/1993 | Denio et al. | 395/700 |

FOREIGN PATENT DOCUMENTS

| | | | |
|---|---|---|---|
| 0016299 | 1/1980 | European Pat. Off. | 15/20 |
| 0212131 | 3/1987 | European Pat. Off. | 1/393 |

Primary Examiner—Almis Jankus
Attorney, Agent, or Firm—Seed and Berry

[57] ABSTRACT

A method and system to scale a graphics image from one graphics display resolution to a different graphics display resolution without the need for creating an entire new set of graphics commands. The present invention allows the non-integer scaling of a graphics image and creates an array of virtual pixels that control intensity of the actual pixels within the graphics memory and keep track of the source of intensity contribution for each actual pixel if scaled graphics images overlap an actual pixel. If one of the multiple sources of intensity for a given actual pixel is subsequently erased, the contribution information allows the actual pixel to be erased in a manner that accounts for the direction of the contribution as well as the actual intensity contribution.

20 Claims, 7 Drawing Sheets

SYSTEM AND METHOD FOR SCALING GRAPHIC IMAGES

TECHNICAL FIELD

The invention relates generally to graphics displays, and in particular, to a system and method for scaling graphic information from one display resolution to a different display resolution without the need for special graphics commands.

BACKGROUND OF THE INVENTION

Computer systems with graphics displays are commonly used for many applications such as computer-aided design, computerized axial tomography (CAT) scanning, and physiological monitoring. The display of graphic images generally requires a special set of command instructions to create and display the graphic image. Special instructions are also required to manipulate the graphic image or to erase the image. These special graphics display systems are uniquely tailored for the specific resolution of the graphics display screen connected to the system.

The graphics display screen is made up of a large number of video dots, called pixels, that are arranged in a series of horizontal rows and vertical columns. The pixels form a grid on the graphics display screen. The grid is usually defined by X and Y coordinates that identify the location of each pixel. There are several "standard" video display sizes. For example, a color graphics adapter (CGA) screen has 640 horizontal pixels and 200 vertical pixels. Other display screens have 640×350 pixels (EGA) or 640×480 pixels (VGA). Still other video display sizes may be specially designed for particular applications.

Each pixel is generally a single storage bit in the graphics display memory. Thus, the pixel is either fully on or fully off. However, there are other options for controlling the appearance of a graphics display. For example, there may be color control bits and intensity control bits associated with each pixel, allowing the system to control the color and intensity of each pixel on the graphics display screen. For example, if there are eight color control bits associated with each pixel, the system can create up to 256 shades of color for each pixel. Similarly, if there are eight intensity control bits for each pixel, the system can create up to 256 intensity levels for each pixel. Each additional graphic option requires additional memory. While the most simple of graphic memories needs only a single data bit for each pixel, a system with color and intensity options may require sixteen bits for each pixel (eight color control bits and eight intensity control bits).

Figure 1:
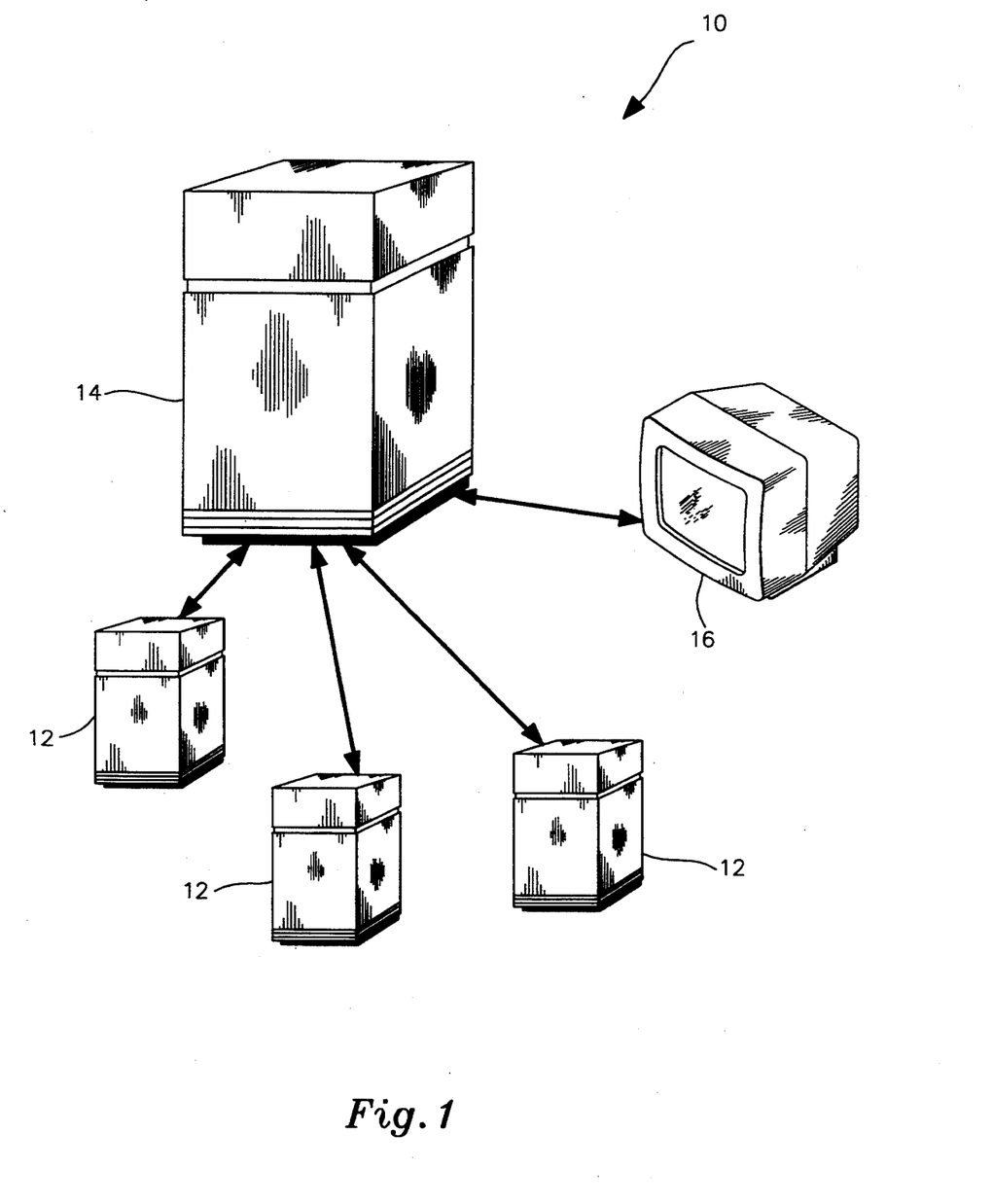
FIG. 1 depicts a typical graphics application for a computer system.
Figure 2A:
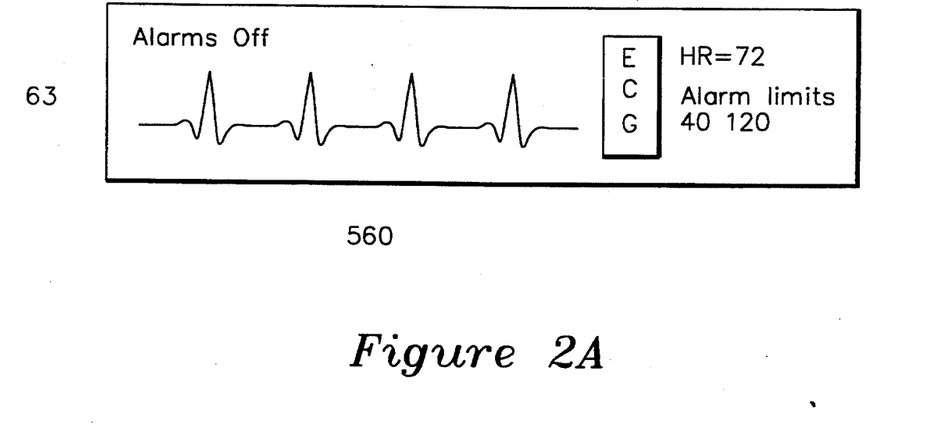
FIG. 2A shows the graphics output from a data module of FIG. 1 and the graphics area allocated to the particular data module.

A typical graphics application 10 is shown in FIG. 1 where a patient physiological monitor contains three patient data module processors 12, all connected to a single host processor 14, which is in turn connected to a graphics display unit 16. Each patient data module is allocated a space on the graphics display, and is free to use that space in a manner dictated by the function of the particular module. For example, FIG. 2A depicts the graphics display of a typical electrocardiogram data module, which has been allocated a graphics display space of 63 vertical pixels and 560 horizontal pixels. Each module is designed to operate with a graphics display of a particular resolution and is closely coupled to the parameters of the particular graphics display resolution.

If a data module designed for use with a low resolution graphics display (e.g. 63×560 pixels) is used with a graphics display having greater resolution (e.g. 252×2240 pixels) without any modification of the module, the graphics image will be unacceptably small and unreadable. In the example given, the graphics image would shrink by 75%. Therefore, switching to a new graphics display with a different resolution requires significant changes in the graphics commands.

Figure 2B:
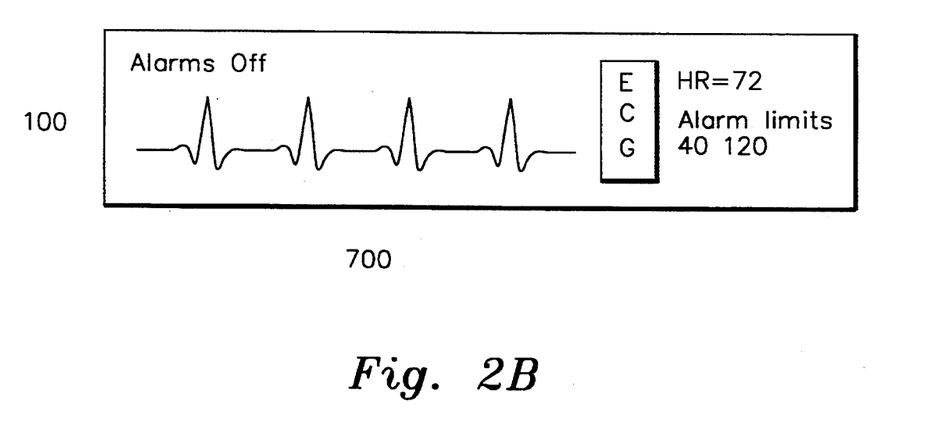
FIG. 2B shows the graphics area allocated to the data module of FIG. 2A, but on a higher resolution graphics display.

One solution to the problem of a small unreadable graphics display is to scale the graphics image from one resolution to another. If the same patient data module of FIG. 2A is used on a graphics display with a different resolution, as shown in FIG. 2B, the data module now has an allocated display space of 100 vertical pixels and 700 horizontal pixels. As can be readily seen, the new horizontal resolution will not be an integer multiple of the old resolution, but will be 1.25 times the old resolution. Similarly, the new vertical resolution is 1.587 times the old resolution.

Because scaling a graphic image would require non-integer scaling, the systems of the prior art cannot easily map the pixel values of the old display resolution into the pixel values of the new display resolution. Thus, scaling is not a simple solution to the problem of altering the resolution of a graphics display.

Consequently, the systems that drive the graphics display must be totally rewritten. This is a costly process and does not allow old data modules to function compatibly with the new graphics display units.

Therefore, it can be appreciated that there is a significant need for a system that can decouple graphics commands from the constraints of a specific graphics display resolution.

SUMMARY OF THE INVENTION

The inventive system determines the old resolution for each component of the existing graphics display and the new resolution for each component of the new graphics display, where the new resolutions are calculated in terms of the number of actual pixels in a graphics memory and the number of virtual pixels associated with each actual pixel. The system scales each component from the old resolution to the new resolution and masks the resulting virtual pixel array to determine the intensity contribution from all possible sources. The system then stores the scaled graphics image in the graphics memory for display where each actual pixel in the graphics memory has a virtual pixel array associated with it. The virtual pixel array provides intensity control for each pixel and spatial control due to the masking operations of the present invention. The system works with any number of data bits allocated to the virtual pixel array.

The scaling for each component of the graphics display may be accomplished with integer multiplication and division operations on a typical microprocessor by multiplying each component by the new resolution and dividing by the old resolution. Alternatively, the system could precalculate the scale factors for each point of the existing graphics display for each of the two components, and a look-up table may be used to store the precalculated values, with the addresses of the look-up table corresponding to each point of the existing display while the contents of the look-up table contain the points corresponding to the new graphics display.

The inventive method involves determining the resolution of the existing display for both the vertical and horizontal components for the display. Similarly, the resolution for both components of the new graphics display must be determined. The determination of the new resolution also takes into account the number of data bits allocated to a virtual pixel array for each actual pixel.

The inventive method involves scaling the graphic image from the old resolution to the new resolution by treating graphic objects as rectangles. The coordinates of the corners of the unsealed rectangle are determined. Alternatively, the method may determine only the coordinates of opposite corners, or one corner of the rectangle if the height and width of the unsealed rectangle are known. The inventive method scales the rectangle by calculating corresponding coordinates in the new resolution.

A mask is applied to the virtual pixel array of the scaled rectangle in order to determine the source of intensity contribution for each actual pixel. Finally, the scaled and masked data is stored in a graphics memory where the scaled graphics image intensity and spatial information associated with each actual pixel.

DETAILED DESCRIPTION OF THE INVENTION

As shown in FIGS. 2A and 2B, the graphics display cannot be readily scaled from the old resolution to a new resolution. To be properly scaled from an old screen resolution to a new screen resolution, each pixel must be scaled by the appropriate non-integral horizontal and vertical scale factors. To accomplish this, the system of the present invention, shown in block diagram form in FIG. 3, creates an array of virtual pixels to control the intensity of the actual pixels and to provide spatial information, giving the appearance of greater screen resolution than actually exists.

Figure 3:
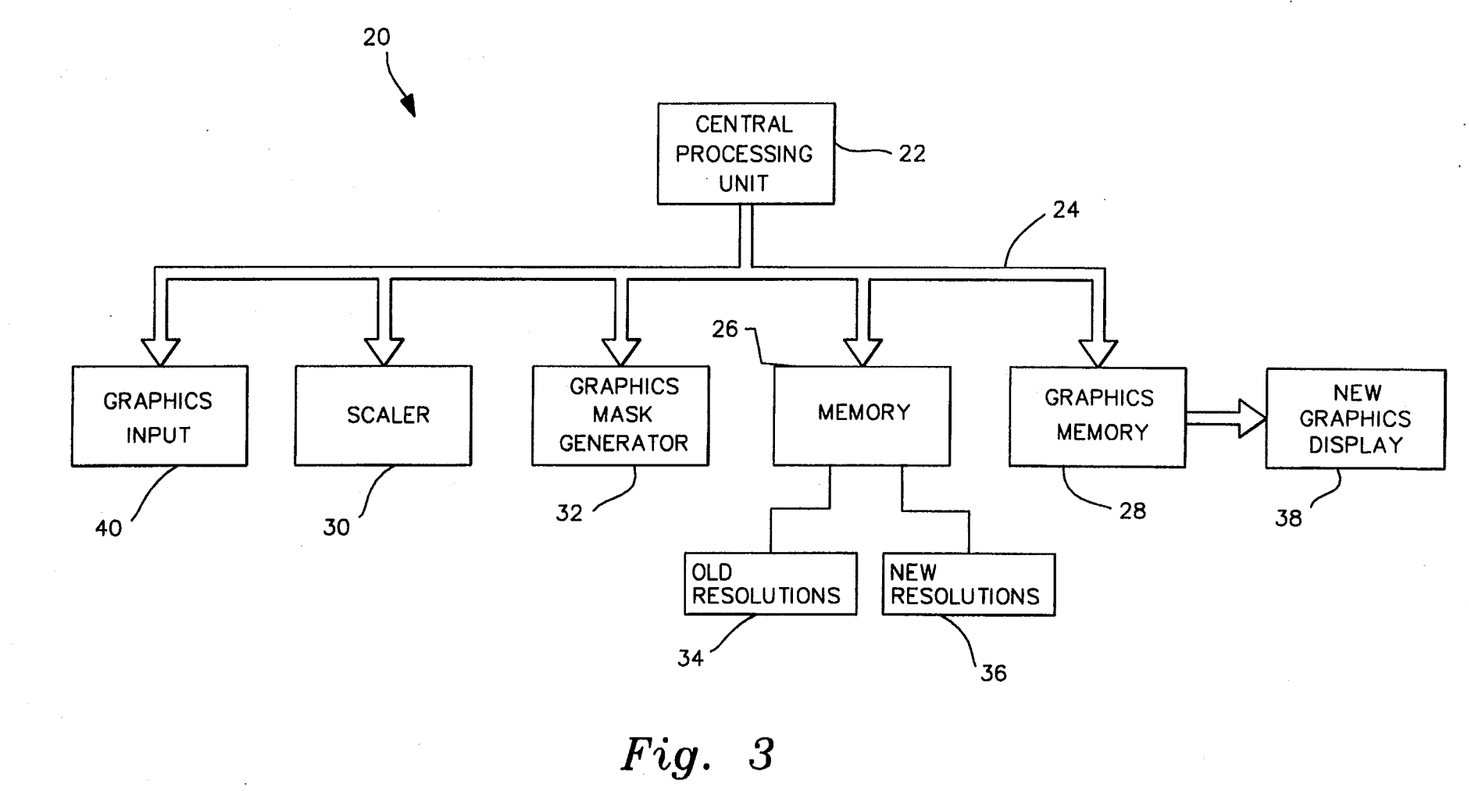
FIG. 3 shows a block diagram of the system of the present invention.

A block diagram of the present system 20, is shown in FIG. 3. The central processing unit (CPU) 22 is connected via a bus 24 to a system memory 26, a graphics memory 28, a scaler 30, and a graphics mask generator 32. The graphics memory 28 may be a separate memory, or may simply be a portion of the main memory 26, which is dedicated to the storage of the graphics data. The graphic masks generator 32, which will be discussed in detail below, generates masks to cover all possible masking needs; the resultant masks may also be stored as part of the main memory 26. Similarly, the old resolution values 34 for the vertical and horizontal components of the existing display are predetermined by the particular application and may be stored in the main memory 26. The new resolution values 36 may also be predetermined and stored in the main memory 26. Alternatively, the new resolution values 36 may be determined by the system by querying the new graphics display 38 to determine the new resolution values 36. These values may be stored in main memory 26 or stored in any other suitable storage location.

The input data to the system 20 may be from any graphics data source and is generically shown as an input block 40. The system 20 accepts data in the old resolution from any suitable input device, such as a patient data module of FIG. 1, converts the data to the new resolution values in the unique manner described below, and stores the resultant data in a graphics memory so that the data is compatible with the resolution of the new graphics display 38.

Figure 4:
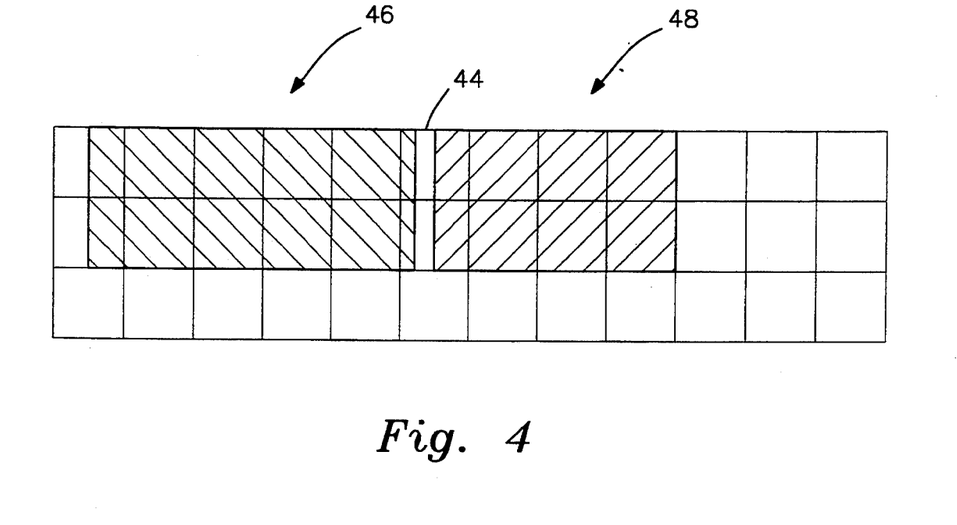
FIG. 4 shows the overlap of scaled graphics objects.

A scaled graphics image may have some overlap if unsealed graphic objects are close to each other. The overlap may cause the graphics display to have a pixel that is lighted from more than one graphics object. Each object contributes a portion of the intensity for a pixel 44 as shown in FIG. 4. A scaled object 46 overlaps ¼ of pixel 44, while a second scaled object 48 overlaps ½ of the same pixel. Therefore, pixel 44 should be lighted to ¾ intensity (¼ of the intensity due to object 46 and ½ intensity due to object 48). The pixel overlap becomes a problem when the system erases one of the multiple sources that are causing a particular pixel to be lighted. Prior art systems at best can only provide intensity information and may result an improperly shaded image if one of the multiple sources of pixel lighting is removed.

Figure 5:
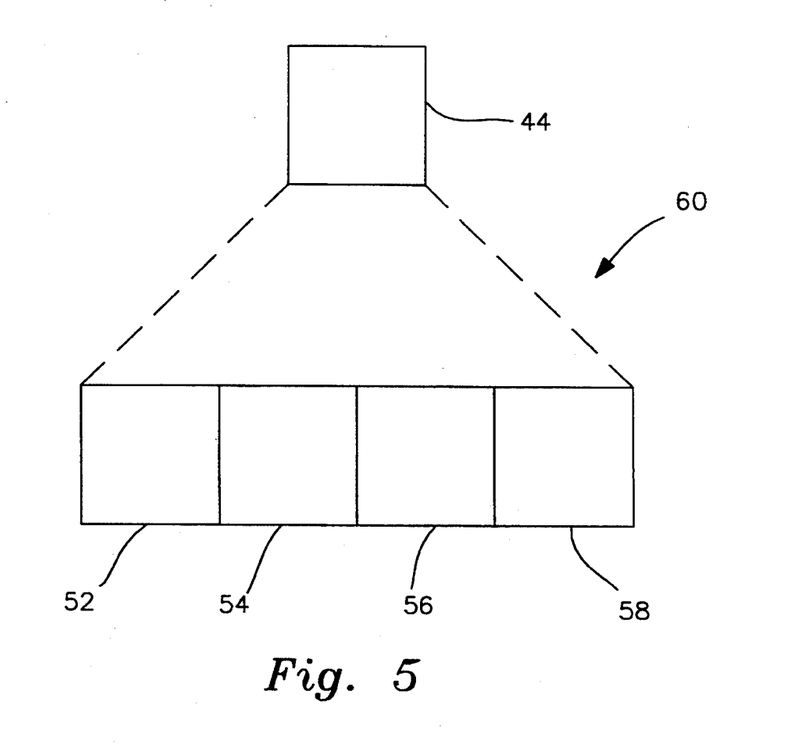
FIG. 5 shows a magnified view of the overlapped pixel of FIG. 4 and the corresponding virtual pixel array.

The present invention processes graphical data in a manner that allows intensity information and the appearance of spatial information for each pixel. A pixel is the smallest area on the display that can be lighted. A graphic display has an actual resolution that is limited by the number of actual pixels. The system of the present invention does not increase the actual display resolution and does not add any actual pixels to the display. The present invention does create the appearance of greater screen resolution by controlling the intensity of the actual pixels through the use of shading techniques, and by accounting for the direction from which the shading occurs. To create the illusion of virtual pixels, the presently preferred embodiment of the invention uses four additional data bits for each pixel. The four data bits could give a possible 16 intensity levels if normal binary coding is used, but such a coding scheme will not allow spatial information to be associated with the pixel. Therefore, the system uses the four data bits, as shown in FIG. 5, to create four levels of pixel intensity as well as providing four locations of spatial lighting information. The actual pixel 44 from FIG. 4 is mapped into four virtual pixels 52, 54, 56, and 58 which form a virtual pixel array 60 corresponding to pixel 44. Rather than a normal binary coding, each virtual pixel contributes equally to the intensity level of the actual pixel. The intensity of an actual pixel is controlled by the number of —1's" present in the virtual pixel array. Thus, actual pixels with the virtual pixel arrays 1100 and 0011 will both be lighted to ½ intensity because each has the same number of 1's in the virtual pixel array. Similarly, actual pixels with the virtual pixel arrays 1000 and 0001 will both be lighted to ¼ intensity because each virtual pixel array has a single 1 present in the array.

However, the virtual pixels also provide spatial information by allowing the system to keep track of the source of intensity contributions. In one example above, actual pixels with virtual pixel arrays 1100 and 0011 are both lighted to ½ intensity. The location of the 1's within the virtual pixel array provide spatial information. The virtual pixel array 1100 indicates that the actual pixel is lighted to ½ intensity from the left, while the virtual pixel array 0011 indicates that the actual pixel is lighted to ½ intensity from the right. Thus, the system of the present invention create four levels of intensity for each actual pixel and provides four bits of spatial information to indicate the source of the intensity contribution.

The system acts as if the four data bits are individual pixels. In FIG. 4, the two objects have been scaled, and the scaled lines partially overlap pixel 44. The pixel 44 is lighted to ¾ intensity (¼ intensity is contributed from object 46 on the left and ½ intensity is contributed from object 48 on the right). Therefore, the corresponding virtual pixel array 60 has the leftmost pixel 52 lighted (to indicate the ¼ intensity contribution from object 46 on the left) and the two rightmost pixels 56 and 58 lighted (to indicate the ½ intensity contribution from object 48 on the right). This spatial information becomes important when attempting to erase the intensity contribution from a particular source or when dealing with an object in the two dimensions of the display screen.

Figure 6A:
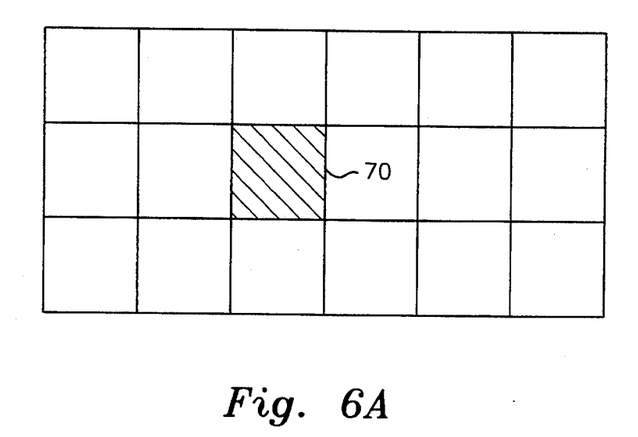
FIG. 6A shows an unsealed object.

From the above discussion, it is apparent that any scaled object may be considered a scaled rectangle. A one pixel thick line before scaling will appear to be a rectangle after scaling. Even a graphics character font, when examined font row by font row, is simply a series of horizontal lines that, when scaled, become a series of rectangles. Thus, we can generalize scaling objects as creating a series of scaled rectangles. In the most general case, shown in FIG. 6A, an unscaled object 70 is one pixel high and one pixel wide. The object is scaled by an arbitrary factor to create the object 70' shown in FIG. 6B.

Figure 6B:
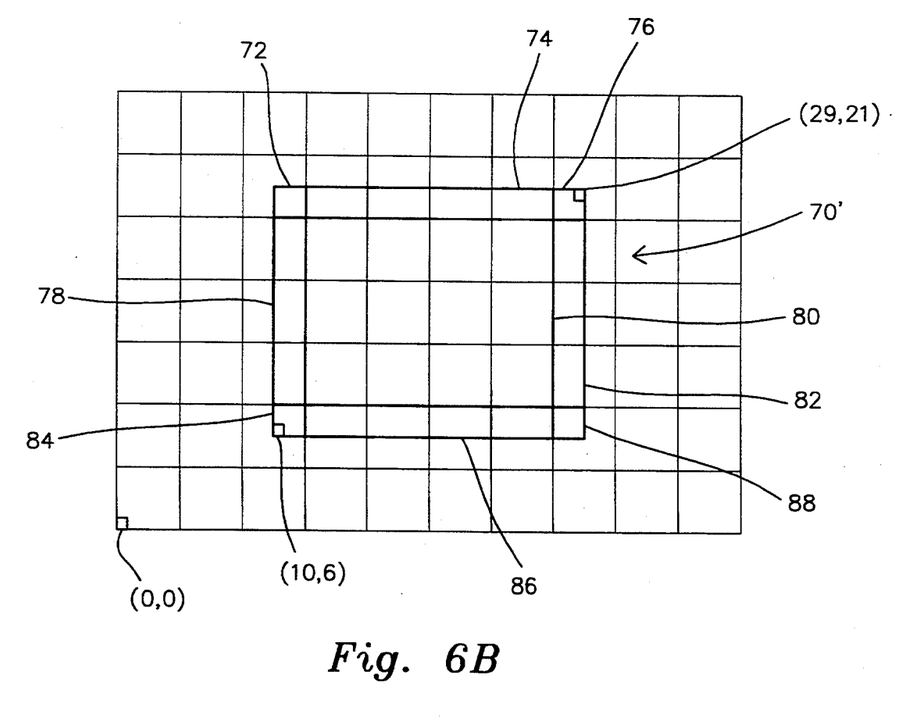
FIG. 6B shows the object of FIG. 6A after scaling.

If we consider the two dimensional scaled object 70' of FIG. 6B, we see that the object overlaps all or part of thirty pixels in nine separate regions. The regions of overlap are labelled 72 through 88 and are each analyzed in a different manner by the system. The virtual pixels of the presently preferred embodiment are coded so that the most significant bit (MSB) is on the left when the system is coding in the horizontal direction. Therefore, the intensity coding for the virtual pixels in region 78, which is partially lighted from the right, is 0011, indicating an intensity of ½ with the intensity contribution coming from the right. Note that the four bits give both intensity information and spatial information. The intensity is controlled by the number of "1's" present in the pixel, while the position of the 1's provide the spatial information. Thus, region 78 is lighted to ½ intensity (as indicated by the two 1's), and the region is lighted due to overlap from the right (as indicated by the position of the 1's within the virtual pixel array). Conversely, the intensity coding for region 82, which is partially lighted from the left, is 1100, indicating an intensity of ½ with the intensity contribution coming from the left.

If the system is coding in the vertical direction, the present embodiment encodes the data so that the MSB is on the top and the least significant bit (LSB) is on the bottom. Region 74 is only overlapped halfway from the bottom of the pixel. Thus, the virtual pixels for region 74 will have the code 0011 indicating that pixel overlapped by region 74 is lighted at ½ intensity and is lighted from the area below the pixel. In contrast, the pixel overlapped by region 86, will also be lighted to ½ intensity, but the system recognizes that the pixel is lighted from above because of the virtual pixel code 1100. Region 80 is completely overlapped by the object 70' and is thus turned completely on with all four virtual pixels being lighted.

The corner regions 72, 76, 84, and 88 are the most difficult to encode. The region 72 is coded from LSB to MSB for intensity contributions coming from the right of the pixel. But, region 72 is also coded from LSB to MSB for intensity contributions coming from the bottom of the pixel. The present invention performs a logical "AND" on each bit of the two groups of intensity contributions (from the right and from below) to derive a single code for the virtual pixel array associated with the pixel overlapped by region 72. The process of performing a logical AND on each bit is often called a "bit-wise" AND operation. In the example of FIG. 6B, in region 72 the intensity contribution comes from both the right (with a virtual pixel coding of 0011) and from below (with a virtual pixel coding of 0011). The bit-wise AND operation results in a virtual pixel array of 0011 for the pixel overlapped by region 72. Similarly, the region 88 is coded from MSB to LSB for intensity contributions coming from the left (with a virtual pixel coding of 1100) or from the top (with a virtual pixel coding of 1100). Thus, the bit-wise AND operation result in a virtual pixel array of 1100 for the pixel overlapped by region 88. It should be noted that the pixel overlapped by region 72 should be lighted to ¼ intensity (½ intensity from below and ½ intensity from the right, theoretically resulting in ¼ intensity). The same is true of region 88, which is lighted from above and from the left. However, experience has shown that this slight error in intensity is not noticeable.

The coding for regions 76 and 84 proceed in a manner similar to that used for regions 72 and 88. However, the coding scheme results in a different virtual pixel array value for regions 76 and 84. Region 76 is coded from LSB to MSB for intensity contributions from below. However, region 76 is coded from MSB to LSB for intensity contributions from the left. In the pixel overlapped by region 76 the intensity contribution comes from both the left (with a virtual pixel coding of 1100) and from below (with a virtual pixel coding of 0011). The bit-wise AND operation results in a virtual pixel array of 0000 for the pixel overlapped by region 76. Similarly, the region 84 is coded from MSB to LSB for intensity contributions coming from above (with a virtual pixel coding of 1100) or from the right (with a virtual pixel coding of 0011). The bit-wise AND operation result in a virtual pixel array of 0000 for the pixel overlapped by region 84. Note that the bit-wise AND operation results in an error for regions 76 and 84, which should be lighted to ¼ intensity, but are actually at zero intensity. Again, experience has shown that this minor error is insignificant because it is not generally noticeable to a person viewing the system.

The object described in FIG. 6B is the most general object that may be encountered. In reality, a scaled object may not have overlap in every direction. For example, if the object had no overlap from below, regions 72, 74, and 76 would not exist. In any given situation, one or more of the regions described above may not exist. Therefore, the system of the present invention need only deal with regions where overlap actually exists.

Despite the flaws in the intensity of the corner regions, the present system can generally scale graphic images with correct intensity and spatial information. Even in the corner regions 72, 76, 84, and 88, the system correctly calculates spatial contribution for pixels that are lighted from overlapping lines.

The masking operations of the system determine how to light the actual pixels. The masks are calculated and applied to the actual pixels to create the properly scaled graphic image. The system uses four basic mask patterns to determine the mask for the regions adjacent region 80. The mask patterns for the corner regions are created by performing a bit-wise AND on each bit of the mask patterns for the adjacent regions as described above. In other words, there is a mask pattern for each region of the general rectangle described above. For example, region 74 uses Mask 1, shown below. Regions 78, 82, and 86 use Mask 2, Mask 3, and Mask 4, respectively. The mask patterns for the corner regions 72, 76, 84, and 88 use mask patterns that are the result of a bit-wise AND operation on two masks from adjacent regions. For example, the mask pattern for region 76 is the bit-wise AND of the mask for regions 74 and 82. Likewise, the mask for region 72 is the bit-wise AND of the masks for regions 74 and 78.

The mask for regions 74, 78, 82, and 86 are determined by the following patterns:

| Mask 1 | Mask 2 | Mask 3 | Mask 4 |
|---|---|---|---|
| [0] 0001 | [0] 0000 | [0] 1000 | [0] 0000 |
| [1] 0011 | [1] 0111 | [1] 1100 | [1] 1110 |
| [2] 0111 | [2] 0011 | [2] 1110 | [2] 1100 |
| [3] 0000 | [3] 0001 | [3] 0000 | [3] 1000 | where each of the masks is determined in a modulo-4 sequence based on the virtual pixel array size for each actual pixel. If there were a different number of virtual pixels per actual pixel, the mask patterns and the modulo size would both be varied accordingly. The mask patterns are applied to the actual pixels to light the pixels according to the previous description.

As an example of the inventive method, the lower left coordinates of the scaled rectangle 70' are (10, 6), as shown in FIG. 6B. The upper right hand coordinates of the scaled rectangle are (29, 21). The system calculates a mask for each respective region using the virtual pixel coordinates and the modulo-4 mask scheme discussed above. The masks for each region of the general rectangle of FIG. 6B are calculated as follows:

Region 74 mask=Mask 1 [$SY_{UR}$ modulo-4]

Region 78 mask=Mask 2 [$SX_{LL}$ modulo-4]

Region 82 mask=Mask 3 [$SX_{UR}$ modulo-4]

Region 86 mask=Mask 4 [$SY_{LL}$ modulo-4]

Region 72 mask=Region 74 mask AND Region 78 mask

Region 76 mask=Region 74 mask AND Region 82 mask

Region 84 mask=Region 78 mask AND Region 86 mask

Region 88 mask=Region 82 mask AND Region 86 mask where each of the masks reflects the amount of overlap into an actual pixel. In the example above, the mask for region 74 ($SY_{UR}=21$) will have a value of 0011. Region 78 mask ($SX_{LL}=10$) will have a mask value of 0011. From the above discussion it follows that the mask values for regions 82 and 86 will both be 1100. The masks for regions 72, 76, 84 and 88 are determined by the bit-wise AND operation on two of the calculated above. Therefore, the masks will be 0011, 0000, 0000, and 1100 for regions 72, 76, 84, and 88, respectively.

Region 80, if it exists in a particular situation, is completely overlapped and thus is completely lighted. Once the system has calculated the masks for the scaled rectangle, the region 80 is calculated. This region will only include complete actual pixels. All other regions will account for overlap of partial actual pixels. Because region 80 will only address complete pixels, the following formulae are used to determine the coordinates of actual pixels that are completely lighted:

$$SX_{LL1}=(SX_{LL}+3)/4$$

$$SY_{LL1}=(SY_{LL}+3)/4$$

$$SX_{UR1}=[(SX_{UR}+1)/4]-1$$

$$SY_{UR1}=[(SY_{UR}+1)/4]-1$$

where $SX_{LL1}$ and $SY_{LL1}$ are the actual pixel coordinates for the lower left corner of region 80, $SX_{UR1}$ and $SY_{UR1}$ are the actual pixel coordinates for the upper right corner of region 80, and $SX_{LL}$, $SY_{LL}$, $SX_{UR}$, and $SY_{UR}$ are the virtual pixel coordinates for the lower left and upper right corners of the scaled rectangle, respectively. The above formulae will provide coordinates (in actual pixels) for the corners of region 80, which will be completely lighted. Any fractions that result from the above calculations are truncated. If there are no complete pixels to be lighted (i.e., region 80 does not exist) in a particular circumstance, then either $SX_{LL1}$ will be greater than $SX_{UR1}$ or $SY_{LL1}$ will be greater than $SY_{UR1}$. If region 80 does not exist, the system calculates the pixel intensity for other regions. If region 80 does exist, the system draws the rectangle of region 80 with a bit mask of 1111. In the above example, the coordinates corresponding to the lower left and upper right corners for region 80 are (3, 2) and (6, 4), respectively. Note that these coordinates are in actual pixels rather than virtual pixels. The actual pixels of region 80 are lighted to full intensity (i.e., the virtual pixel array for each actual pixel in region 80 will be 1111).

The system fills in the actual pixels surrounding region 80 using the masks previously derived. For example, the pixels immediately below region 80 (i.e., region 86) will be lighted using the mask 1100 to indicate that those actual pixels are lighted to ½ intensity from above. Similarly, the pixels immediately to the left of region 80 (i.e., region 78 will be lighted using the mask 0011 to indicate that those actual pixels are lighted to ½ intensity from the right.

Note that some regions are not correctly interpreted. For example, the corner region 76 should be lighted to ¼ intensity, but is not lighted at all since this is lower than the ½ intensity threshold of the present embodiment. Similarly, region 72 should be lighted to ¼ intensity from below and from the right. Because of masking errors, the region is not lighted. However, minor errors of this nature are not noticeable to the normal user.

Maintaining this coding scheme has the advantage that when part of an image is erased from the screen, in a process called scrubbing, the system will scrub virtual pixels using the appropriate spatial information. For example, in FIG. 7, the pixel 100 is lighted to full intensity, but ½ of the intensity contribution comes from object 102 to the left of pixel 100, while ½ of the intensity contribution comes from object 104 to the right of pixel 100. The result is that pixel 100 has a virtual pixel array of 1111. If object 104 is scrubbed from the display screen, the system will erase the virtual pixels that are lighted due to the intensity contribution of object 104. Thus, scrubbing object 104 would result in a virtual pixel array of 1100 for pixel 100. In this manner, the intensity information and spatial information are maintained. If the system scrubs object 104 a second time, there would be no change to the intensity of pixel 100 because of the spatial information provided by the virtual pixel array. In the prior art, a second scrub of object 104 would decrease the intensity of pixel 100 by another ½ because there is no spatial information. Thus, pixel 100 would not be lighted at all, even though it should be lighted to ½ intensity (due to the contribution of object 102).

Figure 7:
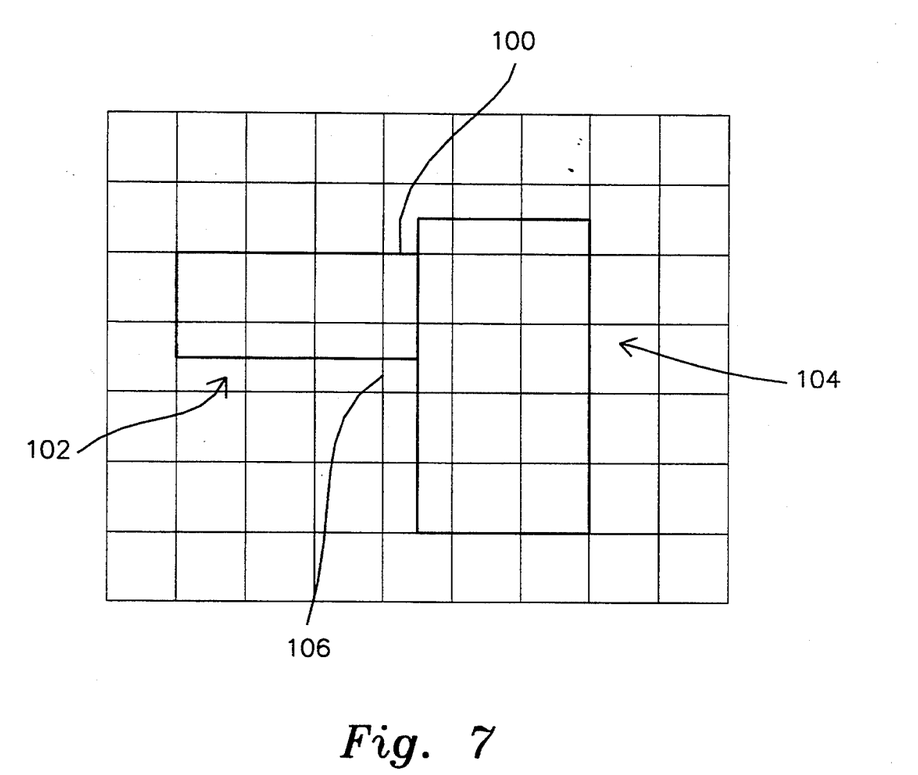
FIG. 7 shows the effect of erasing part of a graphic image.

Similarly, pixel 106 in FIG. 7 is lighted from object 102 (lighted from above and from the left) and from object 104. The intensity contribution from object 102 is determined in the manner previously described (contribution from the left is 1100, and contribution from the top is 1100), with the bit-wise AND result of 1100 due to the intensity contribution from object 102. As previously discussed, the intensity value of ½ is slightly high since only ¼ of the virtual pixel array is overlapped by object 102. The intensity contribution from object 104 is 0011, with the resulting total intensity of 1111 for the virtual pixel associated with pixel 106. If object 104 is scrubbed, the virtual pixel array for pixel 106 will be 1100. If object 104 is scrubbed a second time, the prior art would leave pixel 106 with no intensity contribution. This type of error is much more noticeable to the user than a slightly increased or diminished intensity that results from applying the principles of the present invention.

It should be noted that the present invention is not limited to the number of bits discussed in the presently preferred embodiment. For example, according to the principles of the present invention, eight intensity coding bits could be used to provide an array of eight virtual pixels for each actual pixel. Each of the eight bits would contribute ⅛ of the total intensity of the actual pixel, while providing eight locations of spatial information.

The present invention is also not limited to the encoding scheme described above. For example, the principles of the present invention could easily encode LSB to MSB from right to left and/or LSB to MSB from top to bottom of the graphics display screen. Any suitable coding scheme that provides intensity and spatial information may be used according to the principles of the present invention.

Figure 8A:
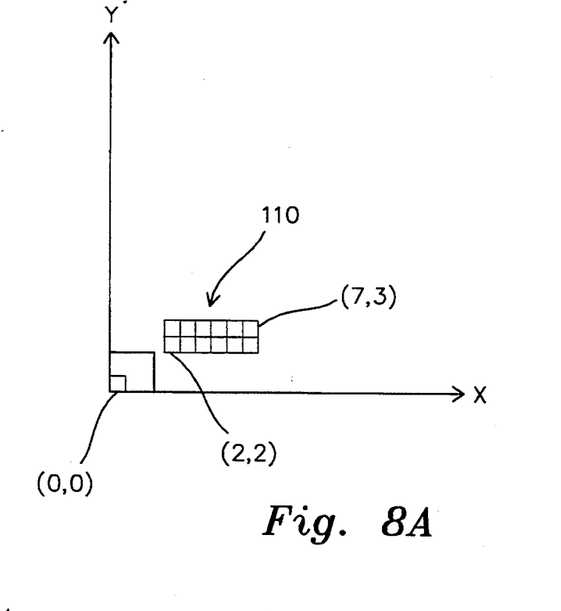
FIG. 8A shows an unsealed graphics object with coordinates determined according to the principles of the present invention.

Because the scaled objects can be considered a series of scaled rectangles, the following discussion details the method of the presently preferred embodiment for scaling rectangles. The X and Y coordinates for one corner of the unscaled rectangle, as well as the height and width of the unscaled rectangle, are provided to the system. In the present embodiment of the invention, the lower left corner coordinates are provided to the system. Alternatively, the coordinates of any other corner could be provided. These coordinates and dimensions may be determined by many methods known in the prior art. The system could also be provided with the coordinates for diagonal corners, which would eliminate the need for height and width information. If we assume that the lower left corner coordinates have been provided to the system, the coordinates for the upper right corner are readily determined from the following formulae:

$$X_{UR} = X_{LL} + \text{width} - 1$$

$$Y_{UR} = Y_{LL} + \text{height} - 1$$

where width and height are the width and height of the unscaled rectangle, $X_{UR}$ and $Y_{UR}$ represent the X and Y coordinates for the upper right corner of the unscaled rectangle, respectively, and $X_{LL}$ and $Y_{LL}$ are the X and Y coordinates for the lower left corner of the unsealed rectangle, respectively. The formulae subtract one from the calculations for the upper right corner coordinates to account for the fact that the pixel at the origin of the display screen is designated (0, 0) in a rectangular coordinate system. A typical calculation of coordinates is shown in FIG. 8A where an unsealed rectangle 110 has a width of six pixels and a height of two pixels.

When the system scales the rectangle, the new coordinates are determined by the following formulae:

$$SX_{LL} = X_{LL} * PF * SFX$$

$$SY_{LL} = Y_{LL} * PF * SFY$$

$$SX_{UR} = ((X_{UR} + 1) * PF * SFX) - 1$$

$$SY_{UR} = ((Y_{UR} + 1) * PF * SFY) - 1$$

where $X_{LL}$ and $SX_{LL}$ represent the X coordinate of the lower left corner of the rectangle before and after scaling, $Y_{LL}$ and $SY_{LL}$ represent the Y coordinate of the lower left corner of the rectangle before and after scaling, $X_{UR}$ and $SX_{UR}$ represent the X coordinate of the upper right corner of the rectangle before and after scaling, and $Y_{UR}$ and $SY_{UR}$ represent the Y coordinate for the upper right corner of the rectangle before and after scaling, respectively.

The horizontal scaling factor is represented by SFX and the vertical scaling factor is represented by SFY. The coordinates are also scaled by the pixel factor, PF. In the present invention, there are 4 virtual pixels per actual pixel, so PF=4. If a different number of virtual pixels is used, the pixel factor must also be adjusted.

The horizontal scale factor may be represented as xn/xd where xd is the horizontal resolution of the unsealed graphics display and xn is the horizontal resolution of the scaled graphics display. Similarly, the vertical scaling factor is represented by yn/yd where yd is the vertical resolution of the unsealed graphics display and yn is the vertical resolution of the scaled graphics display. The numbers are represented as a numerator and denominator so that the computer system may perform the calculations on integers thus increasing the speed of the system. In the example of FIGS. 2A and 2B, the number of horizontal pixels allocated to the unsealed graphics display is 560. Therefore, xd=560. The number of pixels allocated to the new graphics display is 700; therefore xn=700. Similarly, yd=63 and yn=100 in the example of FIGS. 2A and 2B.

Figure 8B:
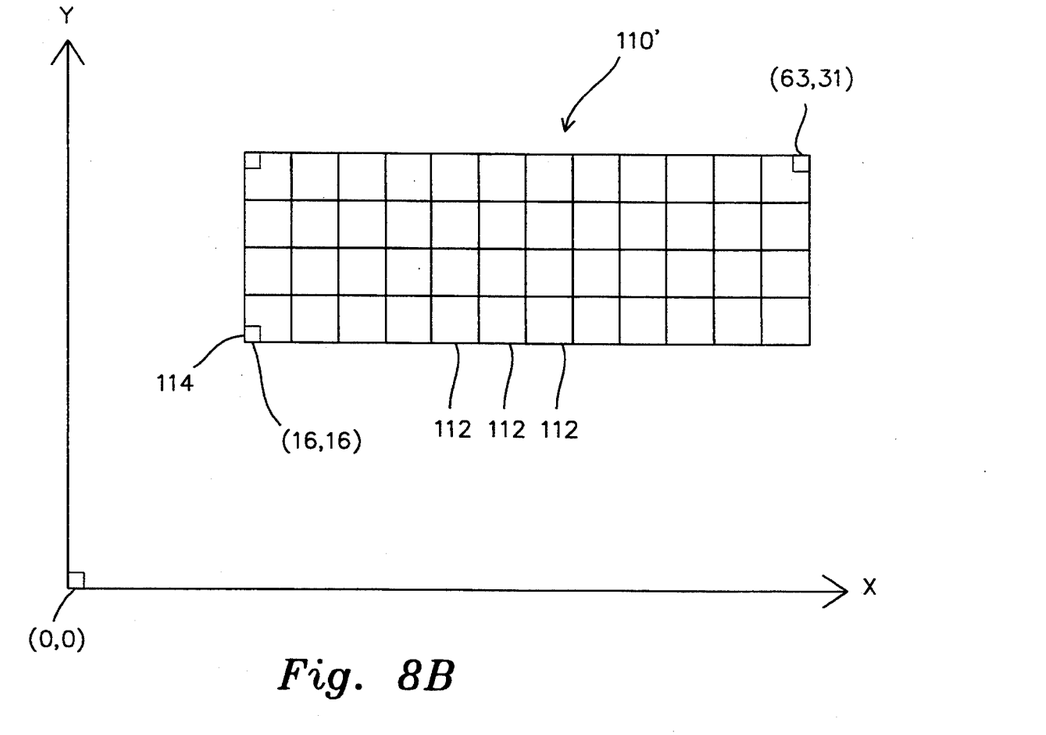
FIG. 8B shows the scaled graphics object of FIG. 8A whose new coordinates are determined according to the principles of the present invention.

As an example of the above calculations, the object 110 in FIG. 8A is shown before scaling. The lower left coordinates are $X_{LL}=2$, and $Y_{LL}=2$; the object has a width of six pixels and a height of two pixels. From the above formulas, the upper right coordinates are determined to be $X_{UR}=7$, and $Y_{UR}=3$, respectively. For the sake of simplicity, the rectangle 110 has been scaled by a factor of two in both the vertical and horizontal directions (SFX=2, and SFY=2). The pixel factor, PF, equals four to create the virtual pixel array of four virtual pixels per actual pixel, resulting in the scaled rectangle 100' shown in FIG. 8B. By applying the scaling formulae, the coordinates for the lower left and upper right corners are $SX_{LL}16$, $SY_{LL}=16$, $SX_{UR}=63$, and $SY_{UR}=31$, respectively. Note that the object 110' is twice the size of the unscaled rectangle 110 in terms of actual pixels, three of which are labelled 112 in FIG. 8B. The system of the present invention scales the rectangle 110' by an additional factor of four to create the virtual pixel array of four virtual pixels per actual pixel. The virtual pixel 114 is located at the virtual pixel coordinates (16, 16), which corresponds to the lower left corner of the scaled rectangle. The resulting rectangle 110' has twice the resolution of the original rectangle 110 in actual pixels, and has the appearance of an additional factor of four resolution due to the virtual pixel array. The virtual pixel array may be used to shade the lines to create the illusion of greater screen resolution, as well as to keep track of the sources of intensity contribution so that erasing a contribution from one source will not adversely affect the intensity contribution from a different source.

As an alternative to calculating the scale factors as graphic images are provided to the system from an input source, it is possible to predetermine the scale factors for each of the points in the existing resolution and store the result in a look-up table. For example, the allocated display area shown in FIG. 2A is 560 horizontal pixels. The system determines that the new horizontal resolution is 700 pixels. Therefore, is possible to apply the formulae given above to determine the new pixel coordinates that correspond to each of the 560 horizontal coordinates of the old resolution.

Similarly, the scale factor calculations may performed for the 63 vertical pixels of the old resolution to determine which vertical pixels the old resolution maps into. Thus, a total of 623 calculations may be performed (one for each possible horizontal and vertical pixel of the existing resolution) and the results stored in a look-up table. These calculations may be performed during a microprocessor initialization sequence or at any other appropriate time before graphic data is actually input to the system. The address of the look-up table corresponds to the vertical and horizontal pixel locations of the existing graphics resolution. The data stored at each location is the corresponding vertical and horizontal pixels of the new graphic resolution.

The system can also query the new graphics display during an initializations sequence or another appropriate time, to determine the new display resolution. In this manner the system may be connected to any graphics display of any resolution without having to alter the software. This does require that the system know that resolution of the existing graphics display.

Graphics text may also be scaled according to the principles of the present invention as the character data stream is provided to the system. However, because of the number of calculations associated with scaling text, it may be more convenient to prescale an entire graphics font and stored the scaled font in an area of memory. The amount of memory required depends on the number of characters needed and the number of fonts to be scaled. The fonts are prescaled according to the principles of the present invention and stored in memory.

Once a graphics object has been scaled according to the principles of the present invention, the object may be moved to a new location on the graphics display. Because the intensity contributions are coded in two directions corresponding to the two components of a typical graphics display, it is not possible to move the graphic image diagonally unless the object is moved an equal number of actual pixels in both directions. That is, an object may be moved diagonally if it is moved the same number of pixels in the vertical direction that it is moved in the horizontal direction.

A more common application is to scroll the graphic image across the graphics display in one direction. That is easily done by shifting all of the bits in the virtual array in the desired direction. Because the virtual pixel array gives the appearance of greater spatial resolution, the graphic image moves smoothly across the graphics display. In contrast, scrolling an image in the prior art often results in an image that "jerks" across the display.

It is to be understood that even though numerous embodiments and advantages of the present invention have been set forth in the foregoing description, the above disclosure is illustrative only, and changes may be made in detail yet remain within the broad principles of the present invention. Therefore, the present invention is to be limited only by the appended claims.

I claim:

1. A system to scale a graphic image from an existing display having an existing display resolution to a new display having a new display resolution where each display is defined in two components corresponding to vertical and horizontal coordinates of the displays, the system comprising:

means for determining a first old resolution and a second old resolution of the existing display, said first and second old resolutions corresponding to the two components of the existing display;

a graphics memory to store the scaled graphic image, said graphic memory controlling a plurality of pixels on the new display, each of said pixels being defined by a number, N, of intensity control bits that each provide equal control of a total intensity of each of said pixels and provide 1/Nth pixel spatial resolution;

means for determining a first new resolution and a second new resolution of a new display, said first and second new resolutions corresponding to the number, N, of said intensity control bits and the two components of the new display;

scaling means for scaling the graphic image from the existing display resolution to the new display resolution by scaling said first old resolution into said first new resolution and said second old resolution into said second new resolution to generate a scaled graphic image;

a mask for masking at least one of said plurality of pixels to determine an intensity and spatial contribution from each of said intensity control bits; and means for storing said scaled graphic image in said graphic memory, whereby each pixel in said graphics memory is controlled by said intensity control bits to give intensity control and an appearance of 1/Nth pixel spatial resolution for each pixel.

2. The system of claim 1 wherein said scaling means scales the graphic image by multiplying the first component of the graphic image, expressed in terms of said first old resolution, by said first new resolution and dividing by said first old resolution to determine the first scaled component of the graphic image, expressed in terms of said first new resolution, and by multiplying the second component of the graphic image, expressed in terms of said second old resolution, by said second new resolution and dividing by said second old resolution to determine the second scaled component of the graphic image, expressed in terms of said second new resolution.

3. The system of claim 1, further including storage means for storing precalculated scale factors for each point of the existing display, expressed in terms of said first old resolution and for each point of the existing display, expressed in terms of said second old resolution in a look-up table, whereby said scaling means addresses a storage location in said storage means corresponding to one of said points and reads the contents of said storage location to determine the scaled pixel location on the new graphics display, expressed in terms of said first or said second new resolution.

4. The system of claim 1, further including means for scrolling to move the entire scaled graphics image in one direction corresponding to either the first component or the second component of the new graphics display by shifting the contents of said graphics memory one virtual pixel location in the direction that the graphic image is to be scrolled.

5. The system of claim 1, wherein said means for determining said first new resolution and said second new resolution queries the new display to determine the resolution of the new display in terms of the two components.

6. A system to scale a graphic image from an existing display an existing display resolution to a new display having a new display resolution where each display is defined in two components corresponding to vertical and horizontal coordinates of the displays, the system comprising:

means for determining a first old resolution and a second old resolution of the existing display, said first and second old resolutions corresponding to the two components of the existing display;

a graphics memory to store the scaled graphic image, said graphic memory controlling a plurality of pixels on the new display, each of said pixels being defined by four intensity control bits that each control one-quarter of a total intensity of each of said pixels and provide one-quarter pixel resolution;

means for determining a first new resolution and a second new resolution of a new display, said first and second new resolutions corresponding to the number of said intensity control bits and the two components of the new display;

scaling means for scaling the graphic image from the existing display resolution to the new display resolution by scaling said first old resolution into said first new resolution and said second old resolution into said second new resolution to generate a scaled graphic image;

a mask for masking at least one of said plurality of pixels to determine an intensity and spatial contribution from each of said intensity control bits; and means for storing said scaled graphic image in said graphic memory, whereby each pixel in said memory is controlled by said intensity control bits to provide intensity control and an appearance of one-quarter pixel spatial resolution for each pixel.

7. The system of claim 6 wherein said scaling means scales the graphic image by multiplying the first component of the graphic image, expressed in terms of said first old resolution, by said first new resolution and dividing by said first old resolution to determine the first scaled component of the graphic image, expressed in terms of said first new resolution, and by multiplying the second component of the graphic image, expressed in terms of said second old resolution, by said second new resolution and dividing by said second old resolution to determine the second scaled component of the graphic image, expressed in terms of said second new resolution.

8. The system of claim 6, further including means for scrolling to move the entire scaled graphics image in one direction corresponding to either the first component or the second component of the new graphics display by shifting the contents of said graphics memory one virtual pixel location in the direction that the graphic image is to be scrolled.

9. The system of claim 6, further including storage means for storing precalculated scale factors for each point of the existing display, expressed in terms of said first old resolution and for each point of the existing display expressed in terms of said second old resolution in a look-up table, whereby said scaling means addresses a storage location in said storage means corresponding to one of said points and reads the contents of said storage location to determine the scaled pixel location on the new graphics display, expressed in terms of said first or said second new resolution.

10. The system of claim 9, wherein said means for determining said first new resolution and said second new resolution queries the new display to determine the resolution of the new display in terms of the two components.

11. A system to scale a graphics image from an existing display having an existing display resolution to a new display having a new display resolution where each display is defined in two components corresponding to vertical and horizontal coordinates of the displays, the system comprising:

a first storage location containing first and second old resolution values defining the existing display resolution of the two components of the existing display;

a second storage location containing first and second new resolution values defining the new display resolution of the two components of the new display;

a graphics input unit containing the graphics image defined in terms of said old resolution values;

a central processor, electrically coupled to said graphics input unit to control the flow of data from said graphics input unit;

a scaler, electrically coupled to said central processor to receive and convert the graphics image from an old resolution corresponding to said old resolution values to a new resolution corresponding to said new resolution values thereby generating a scaled graphic image;

a graphics memory electrically coupled to said central processor to receive said scaled graphic image, said graphics memory controlling a plurality of pixels on the new display, each of said pixels being defined by a number, N, of intensity control bits that each provide equal control of a total intensity of each of said pixels and provide 1/Nth pixel spatial resolution; and a graphics mask generator, electrically coupled to said central processor and said graphics memory to create mask patterns indicative of an intensity level and spatial resolution of said pixels, whereby each of said pixels in said graphics memory is controlled by said intensity control bits to give intensity control and an appearance of 1/Nth pixel spatial resolution for each pixel.

12. The system of claim 11 wherein said scaler scales the graphic image by multiplying the first component value of each pixel of the existing display of the graphic image, expressed in terms of said first old resolution, by said first new resolution and dividing by said first old resolution to determine the first scaled component value of each of said pixels of the new display of the graphic image, expressed in terms of said first new resolution, and by multiplying the second component value of each pixel of the existing display of the graphic image, expressed in terms of said second old resolution, by said second new resolution and dividing by said second old resolution to determine the second scaled component value of each of said pixels of the new display of the graphic image, expressed in terms of said second new resolution.

13. The system of claim 11 wherein said memory contains a look-up table for storing precalculated scale factors for each point of the existing display, expressed in terms of said first old resolution and for each point of the existing display, expressed in terms of said second old resolution, whereby said scaler addresses a storage location in said look-up table corresponding to one of said points and reads the contents of said storage location to determine the scaled pixel location on the new graphics display, expressed in terms of said first or said second new resolution.

14. A method for scaling a graphic image from an existing display having an existing display resolution to a new display having a new display resolution where each display is defined in two components corresponding to vertical and horizontal coordinates of the displays, the method comprising the steps of:

(a) determining a first old resolution value of the existing display, said first old resolution value corresponding to a first one of the two components of the existing display;

(b) determining a second old resolution value of the existing display, said second old resolution value corresponding to a second one of the two components of the existing display;

(c) determining a first new resolution value of the new display, said first new resolution value corresponding to a number of intensity control bits for each of a plurality of pixels in a graphics memory and a first one of the two components of the new display;

(d) determining a second new resolution value of the new display, said second new resolution value corresponding to said number of intensity control bits and a second one of the two components of the new display;

(e) scaling the graphic image from an old resolution corresponding to said first and second old resolution values to a new resolution corresponding to said first and second new resolution values, thereby generating a scaled graphic image;

(f) masking said scaled graphic image to determine an intensity and spatial contribution from the graphic image for each of said plurality of pixels; and (g) storing said scaled graphic image in said graphics memory containing said number of intensity control bits for each of said plurality of pixels, whereby each pixel in said graphics memory is controlled by said intensity control bits to provide intensity control and create the appearance of spatial control for each pixel.

15. The method of claim 14, further including the steps of precalculating and storing scale factors for each point of the existing display, expressed in terms of said first old resolution value and for each point of the existing display, expressed in terms of said second old resolution value in a look-up table, whereby said step of scaling is accomplished by addressing a storage location in said look-up table corresponding to one of said points and reads the contents of said look-up table to determine the scaled pixel location on the new display, expressed in terms of said first or said second new resolution values.

16. The method of claim 14 wherein said step of scaling further includes the steps of:

calculating first and second coordinates for each of the corners of an unscaled graphic rectangle that represents a portion of an unscaled graphic image, said first and second coordinates corresponding to said first and second components expressed in terms of said first and said second old resolution values;

scaling from said first old resolution value to said first new resolution value by multiplying said first coordinate by said first new resolution value and dividing by said first old resolution value for each corner of said unscaled rectangle; and scaling from said second old resolution value to said second new resolution value by multiplying said second coordinate by said second new resolution value and dividing by said second old resolution value for each corner of said unscaled rectangle.

17. The method of claim 16 wherein the steps of calculating coordinates and scaling said first and second old resolutions to said first and second resolutions further includes the steps of calculating said first and second coordinates for opposite corners of said unscaled rectangle and scales said first and second old resolutions to said first and second new resolutions only for said opposite corners of said unscaled rectangle.

18. A method for scaling a graphic image from an existing display having an existing display resolution to a new display having a new display resolution where each display is defined in two components corresponding to vertical and horizontal coordinates of the displays, the method comprising the steps of:

(a) determining a first old resolution of the existing display, said first old resolution corresponding to a first one of the two components of the existing display;

(b) determining a second old resolution of the existing display, said second old resolution corresponding to a second one of the two components of the existing display;

(c) determining a first new resolution of the new display, said first new resolution corresponding to four intensity control bits for each of a plurality of pixels in a graphics memory and a first one of the two components of the new display;

(d) determining a second new resolution of the new display, said second new resolution corresponding to said four intensity control bits and a second one of the two components of the new display;

(e) calculating first and second coordinates for each corner of an unscaled graphic rectangle that represents a portion of an unscaled graphic image, said first and second coordinates corresponding to said first and second components expressed in terms of said first and said second old resolutions;

(f) scaling from said first old resolution to said first new resolution by multiplying said first coordinate by said first new resolution and dividing by said first old resolution for each of said corners of said unscaled rectangle;

(g) scaling from said second old resolution to said second new resolution by multiplying said second coordinate by said second new resolution and dividing by said second old resolution for each of said corners of said unscaled rectangle thereby generating a scaled graphic image;

(h) masking said scaled graphic image to determine an intensity contribution from each of said intensity control bits; and (i) storing said scaled graphic image in said graphics memory containing said number of intensity control bit for each of said plurality of pixels, whereby each pixel in said graphics memory is controlled by said intensity control bits to provide intensity control and create the appearance of spatial control for each pixel.

19. The method of claim 18 wherein the steps e-g of calculating coordinates and scaling said first and second old resolutions to said first and second resolutions further includes the steps of calculating said first and second coordinates for opposite corners of said unsealed rectangle and scales said first and second old resolutions to said first and second new resolutions only for said opposite corners of said unsealed rectangle.

20. The method of claim 18, further including the steps of precalculating and storing scale factors for each point of the existing display, expressed in terms of said first old resolution and for each point of the existing display, expressed in terms of said second old resolution in a look-up table, whereby said steps f-g of scaling is accomplished by addressing a storage location in said look-up table corresponding to one of said points and reads the contents of said look-up table to determine the scaled pixel location on the new graphics display, expressed in terms of said first or said second new resolution.

* * * * *

UNITED STATES PATENT AND TRADEMARK OFFICE
CERTIFICATE OF CORRECTION

PATENT NO.     :   5,426,723
DATED          :   June 20, 1995
INVENTOR(S)    :   Eric R. Horsley It is certified that error appears in the above identified patent and that said Letters Patent is hereby corrected as shown below:

In column 14, claim 9, line 41, after "display" and before "expressed", please insert --,--.

Signed and Sealed this

Seventh Day of November, 1995

Attest:

BRUCE LEHMAN

*Attesting Officer*      *Commissioner of Patents and Trademarks*